US011787897B2

(12) United States Patent
Liang et al.

(10) Patent No.: US 11,787,897 B2
(45) Date of Patent: Oct. 17, 2023

(54) PROCESS FOR PRODUCING A POLYURETHANE FOAM INSOLE

(71) Applicant: BASF SE, Ludwigshafen am Rhein (DE)

(72) Inventors: Zhen Peng Liang, Guangzhou (CN); Yun Bang Zhong, Guangzhou (CN)

(73) Assignee: BASF SE, Ludwigshafen am Rhein (DE)

( * ) Notice: Subject to any disclaimer, the term of this patent is extended or adjusted under 35 U.S.C. 154(b) by 576 days.

(21) Appl. No.: 16/771,750

(22) PCT Filed: Dec. 4, 2018

(86) PCT No.: PCT/EP2018/083529
§ 371 (c)(1),
(2) Date: Jun. 11, 2020

(87) PCT Pub. No.: WO2019/115296
PCT Pub. Date: Jun. 20, 2019

(65) Prior Publication Data
US 2021/0139638 A1    May 13, 2021

Related U.S. Application Data

(63) Continuation of application No. PCT/CN2017/115891, filed on Dec. 13, 2017.

(51) Int. Cl.
| | |
|---|---|
| *C08G 18/78* | (2006.01) |
| *A43B 17/00* | (2006.01) |
| *A43B 17/14* | (2006.01) |
| *B29D 35/14* | (2010.01) |
| *B32B 5/02* | (2006.01) |
| *B32B 5/24* | (2006.01) |
| *C08G 18/08* | (2006.01) |
| *C08G 18/48* | (2006.01) |
| *C08G 18/72* | (2006.01) |
| *C08G 18/73* | (2006.01) |
| *C08G 18/83* | (2006.01) |
| *C08J 9/12* | (2006.01) |
| *B29K 75/00* | (2006.01) |
| *B29K 105/04* | (2006.01) |
| *C08G 101/00* | (2006.01) |

(52) U.S. Cl.
CPC ............ *C08G 18/78* (2013.01); *A43B 17/006* (2013.01); *A43B 17/14* (2013.01); *B29D 35/14* (2013.01); *B32B 5/02* (2013.01); *B32B 5/245* (2013.01); *C08G 18/14* (2013.01); *C08G 18/4816* (2013.01); *C08G 18/725* (2013.01); *C08G 18/73* (2013.01); *C08G 18/833* (2013.01); *C08J 9/125* (2013.01); *B29K 2075/00* (2013.01); *B29K 2105/045* (2013.01); *B32B 2266/0278* (2013.01); *B32B 2266/06* (2013.01); *B32B 2437/02* (2013.01); *C08G 2101/00* (2013.01); *C08G 2110/0033* (2021.01); *C08G 2410/00* (2013.01); *C08J 2201/022* (2013.01); *C08J 2203/10* (2013.01); *C08J 2205/05* (2013.01)

(58) Field of Classification Search
CPC ..... A43B 17/003; A43B 17/006; A43B 17/14; B29D 35/0009; B29D 35/122; B29D 35/14; B29K 2075/00; B29K 2105/045; B32B 5/02; B32B 5/245; B32B 2266/0278; B32B 2266/06; B32B 2437/02; C08G 18/14; C08G 18/4816; C08G 18/725; C08G 18/73; C08G 18/78; C08G 18/833; C08G 2101/00; C08G 2110/0033; C08G 2410/00; C08J 9/125; C08J 2201/022; C08J 2203/10; C08J 2205/05

See application file for complete search history.

(56) References Cited

U.S. PATENT DOCUMENTS

| | | | |
|---|---|---|---|
| 3,766,669 A | | 10/1973 | Pearsall |
| 5,693,682 A | * | 12/1997 | Kuczynski ......... C08G 18/6552 521/173 |
| 5,994,245 A | * | 11/1999 | Marier ..................... B32B 5/18 428/95 |
| 2008/0052842 A1 | | 3/2008 | Palmer |
| 2011/0283560 A1 | | 11/2011 | Portzline et al. |
| 2014/0223673 A1 | | 8/2014 | Wardlaw et al. |
| 2014/0259801 A1 | | 9/2014 | Grondin |

FOREIGN PATENT DOCUMENTS

| | | |
|---|---|---|
| CN | 1730554 A | 2/2006 |
| CN | 101585901 A | 11/2009 |
| CN | 101864164 A | 10/2010 |
| CN | 105011467 A * | 11/2015 |
| WO | WO-2015125497 A1 * | 8/2015 ........... A47C 27/006 |

OTHER PUBLICATIONS

International Search Report and Written Opinion for corresponding PCT/EP2018/083529 dated Mar. 13, 2019, 9 pages.

* cited by examiner

*Primary Examiner* — John M Cooney
(74) *Attorney, Agent, or Firm* — Armstrong Teasdale LLP

(57) ABSTRACT

Described herein is a method for producing a PU foam insole, including the following steps of: (1) pouring the raw materials used to form a PU foam into a mould, reacting to obtain a PU sheet, where the height of the mould cavity is from about 1.0 to about 1.6 times of the total thickness of two finished insoles; (2) splitting the PU sheet into two halves in the horizontal direction to obtain two pieces of PU insole material, where one surface of the material has open pores, and the other surface of the material has a skin; and (3) attaching a piece of fabric onto the surface having open pores of the material obtained in step (2). Also described herein is a PU foam insole produced by the method.

19 Claims, 1 Drawing Sheet

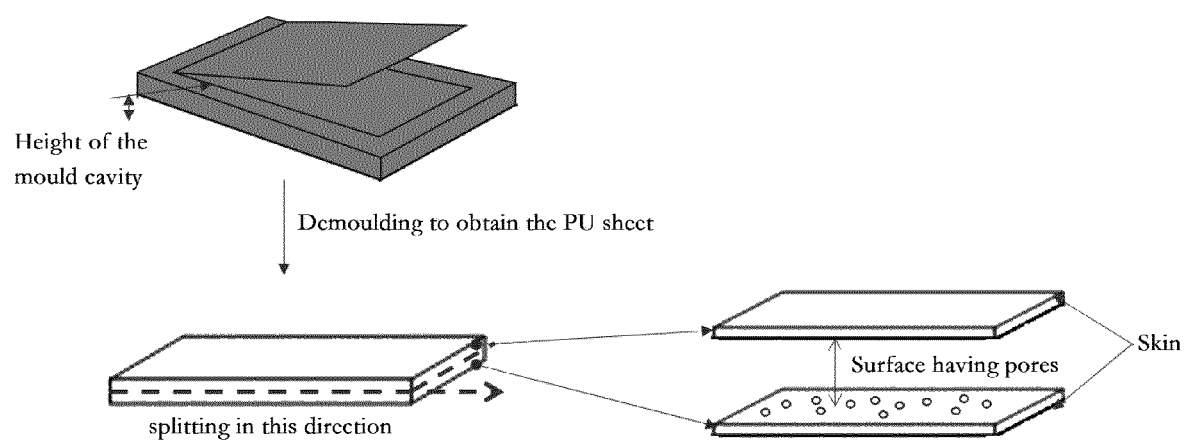

PROCESS FOR PRODUCING A POLYURETHANE FOAM INSOLE

CROSS-REFERENCE TO RELATED APPLICATIONS

This application is a U.S. National Phase Application of PCT/EP2018/083529, filed Dec. 4, 2018, which claims the benefit of priority to PCT Application PCT/CN2017/115891, filed Dec. 13, 2017, the entire contents of which are hereby incorporated by reference herein.

TECHNICAL FIELD

The present invention relates to a process for producing a polyurethane (PU) foam insole and an insole obtainable by the process.

BACKGROUND

PU has been increasingly used as shoe materials. Nowadays, PU insoles have been widely used in medium and high grade sports shoes, casual shoes and other fields because of its easy processing, good elasticity, excellent cushioning performance, good wearing comfort and deformation resistance and so on. Currently there are two types of PU insoles: a foamed breathable insole and an in-mould casting insole.

The foamed breathable insole is generally produced by mixing a polyol composition with a polyisocyanate component, then foaming and ageing in a large-size mould to form a foam with a long strip or bulk shape, post-ageing, then splitting into foam sheets with a desired thickness, subsequently attaching a piece of fabric to the foam sheet by an adhesive, and finally hot pressing and cutting into insoles with different sizes.

The in-mould casting insole is generally produced by mixing a polyol composition with a polyisocyanate component, then pouring it into a mould in which a piece of fabric has been attached to the upper-half mould, then closing the mould, foaming and ageing for 5 to 6 minutes, after foaming, the PU attaches to the fabric which would contact with the sole, and then demoulding and cutting into insoles. The insoles produced by the in-mould casting process have a relatively high density (typically 0.32±0.02 $g/cm^3$). In addition, the insoles produced by the in-mould casting process have poor air permeability, because there are dense skins on both of its upper and lower surfaces.

The differences between the foamed breathable insole and the in-mould casting insole lie in:

(1) On one hand, the size of the mould used for the foamed breathable insole is relatively large (for example, 200 cm long×110 cm wide×100 cm deep), and the resulting PU foam is generally rectangular and needs to be split into a sheet with a thickness of the insole and to be further processed in order to obtain the foamed breathable insole. On the other hand, the size of the mould used for the in-mould casting insole is relatively small (for example, corresponding to the size of the insole), the article obtained after demoulding is a semi-finished product having a shape of the insole, and the semi-finished product needs to be further processed to obtain the in-mould casting insole;

(2) The overall foaming time for the foamed breathable insole is relatively long, and it can produce many pairs of insole in one cycle; whereas the overall foaming time for the in-mould casting insole is relatively short, but it can only produce one pair of insole in one cycle;

(3) The ageing time for the foamed breathable insole is relatively long, usually from about 30 to about 90 minutes, and it is necessary to carry out post-ageing which generally lasts for about 5 hours or longer; whereas the ageing time for the in-mould casting insole is relatively short, usually from about 5 to about 6 minutes, and it is generally unnecessary to carry out the post-ageing;

(4) There are many process steps for producing the foamed breathable insole, such as post-ageing, splitting, etc.; whereas the process steps for producing the in-mould casting insole is fewer, and it is not necessary to carry out the step of splitting;

(5) During the production of the foamed breathable insole, because on one hand, the head and tail of the foam and the top and bottom skins of the foam could not be used, and on the other hand, it will produce a lot of scraps during the final cutting step, all of these being not recyclable, thus it results in a great waste of the material and a low utilization ratio (generally from about 50 to about 65%). On the contrary, the in-mould casting insole is directly formed and only needs to cut the flash, thus resulting in a high utilization ratio;

(6) The density of the foamed breathable insole is relatively low, and there is a density gradient distribution in the foam, with the density of the top being high, while the density of the bottom being low, and the overall density is usually 0.13±0.01 $g/cm^3$; whereas the density of the in-mould casting insole is relatively high, usually 0.32±0.02 $g/cm^3$;

(7) The foamed breathable insole has no skins and thus has a poor appearance; whereas the in-mould casting insole has a skin and thus has a good appearance;

(8) The resilience of the foamed breathable insole is bad; whereas the resilience of the in-mould casting insole is better; and (9) The foamed breathable insole is air permeable and mildew-proof; whereas the in-mould casting insole is not air permeable, and thus is not mildew-proof.

The prior art discloses a variety of methods for producing the foamed breathable insole and the in-mould casting insole.

For example, CN 1730554A discloses a process for producing a foamed breathable insole, wherein a polyether polyol, a polymeric polyol, a pigment paste, a catalyst, a blowing agent, a pore former, a silicon surfactant, ethylene glycol, an antibacterial agent are mixed in a vessel, and the resulted mixture (abbreviated as white material) is kept at a constant temperature of 15 to 30° C.; at the same time, the MDI prepolymer is also kept at a constant temperature 30° C., to which a rubber powder is added (abbreviated as black material); then the white material and the black material are stirred in a ratio of 100:50 to 100:120 at a speed of 200-3500 rpm; after stirring for 10 to 25 seconds, the mixture is poured rapidly into a mould with a constant temperature of 35-50° C.; then the mould is closed; the materials are allowed to age for 30-90 minutes; then the formed article is demoulded and split to obtain the finished product.

CN 101864164A discloses a process for producing a foamed breathable insole characterized in that it comprises the following steps: (1) placing a polyol composition and an isocyanate in a thermostatic chamber under a temperature of 7-35° C. for 5-8 hours, respectively; (2) coating a mould with a mould release agent, and maintaining the mould under a temperature of 45-48° C.; (3) pouring the polyol composition into a stirred tank, adding a catalyst, a surfactant, an antibacterial agent, a blowing agent, a pigment paste and a pore former, and stirring together for 120-150 seconds, then adding the isocyanate and stirring for 10 to 20 seconds; (4) pouring the stirred mixture into the mould within 5 seconds, and blowing off the bubbles resulted from the pouring by means of an air gun, then closing and locking the mould; (5) after 35 to 45 minutes, opening the mould and removing the formed article, and splitting into sheets with the desired size. The mould size used in the application is at least 200 cm long×110 cm wide×100 cm deep, which is large enough to make the raw materials to be fully mixed, foamed and aged in the mould, so that the thus-obtained insole is light and air permeable.

CN 101585901A discloses a PU foam and a process for producing the same, which comprises adding a polyether polyol, a chain extender, a blowing agent, a catalyst and a foam stabilizer in a certain ratio into a vessel and mixing well, then keeping the resulted material under about room temperature; pouring a prepolymer of diphenylmethane diisocyanate maintained at the same temperature into the vessel and rapidly stirring at a high speed of 1000 to 10000 rpm for 8 to 16 seconds, then quickly pouring it into a foam box; controlling the foaming time to be from 18 to 28 seconds; about 150-300 seconds after freely foaming to the highest point, placing the material into an oven to age for 4 to 72 hours; then cutting the foam for the subsequent process steps. A foamed breathable insole was obtained in this application. There are a lot of waste materials and thus the utilization rate of the material is low. Moreover, while the air permeability of the obtained foamed breathable insole is good, the appearance is poor because there is no skin.

The processes for producing insoles disclosed in the prior art still have drawbacks, and therefore there is a need in the art for an insole production process which is further improved over the prior art and could result in an insole with better properties.

DESCRIPTION OF THE INVENTION

The present invention provides a process for producing a PU foam insole. In the the present invention, a mould having a flat inner cavity is used, i.e., the height of cavity is about 1.0 to about 1.6 times of the total thickness of two finished insoles, whereby a PU foamed sheet is obtained. The foamed sheet is split into two halves in the horizontal direction, in other words, along the plane defined by the length and the width, thus a PU material having a dense skin on one surface and open pores on the other surface is obtained. Subsequently, a piece of fabric is attached onto the surface having open pores, then subject to the hot pressing and other process steps, and finally an insole is obtained which possesses both of good air permeability and resilience. The porous surface attached with the fabric will contact directly with the sole, which has a high porosity and good air permeability. The surface having a dense skin will contact with the shoe, which has a complete skin obtained by foaming and a good appearance. Moreover, due to the dense skin, a good resilience can be obtained under a low density of the foam.

The PU foam insole produced by the invention has a low density and a good resilience, a bright and shiny skin appearance, and good air permeability, and the raw material utilization rate is relatively high. The invention overcomes the shortcomings of the in-mould casting insole such as a high density and poor air permeability, and can improve the environmental friendliness and meet the increasing requirements of the consumers.

In particular, the present invention relates to a process for producing a PU foam insole, comprising the following steps of:

(1) pouring the raw materials used to form a PU foam into a mould, reacting to obtain a PU sheet, wherein the height of the mould cavity is about 1.0 to about 1.6 times of the total thickness of two finished insoles;

(2) splitting the PU sheet into two halves in the horizontal direction to obtain two pieces of PU insole material, wherein one surface of the material has open pores, and the other surface of the material has a skin; and (3) attaching a piece of fabric onto the surface having open pores of the material obtained in step (2).

In an embodiment of the invention, the cavity of the mould may be a flat body with relatively high width and length and a relatively low height, wherein the height is from about 1.0 to about 1.6 times of the total thickness of two finished insoles. The reason why the height of the mould cavity is selected to be about 1.0 times or more than the total thickness of two finished insoles is during the later steps such as hot pressing, the split sheet may be slightly compressed. Therefore, in order to make the thickness of the split sheet after being subjected to compression to correspond to the thickness of the finished insole, it is necessary that the thickness of the split sheet is equal or slightly thicker than the thickness of the finished insole, that is, the thickness of the PU insole material formed in the mould is equal to the total thickness of two finished insoles or slightly more than the total thickness of two finished insoles. In particular, the he mould cavity can be determined according to actual requirements, and is typically f 1.0 to about 1.6 times, preferably from about 1.1 to about 1.4 times, more preferably from about 1.1 to about 1.3 times, and most preferably from about 1.1 to about 1.2 times of the total thickness of two finished insoles. For example, the height of the mould cavity may be from about 0.2 to about 8.0 cm, preferably from about 0.2 to about 5.0 cm, more preferably from about 0.2 to about 3.0 cm, and most preferably from about 0.3 to about 2.0 cm.

In another embodiment, the shape of the mould cavity is not limited to a cube or a rectangle, or the profile of the mould cavity may also correspond to the profile or the enlarged profile of the insole, so that when the foamed sheet is cut into the insole, it is not necessary to cut excess corners and would save the material.

The mould used according to the present invention may be made from various materials commonly used in the art and are not limited to metals such as iron, steel, aluminum or alloys thereof, and may be plastic such as PP or PE.

The length and width of the mould cavity are not limited to the size for producing one insole, they may also be bigger than one insole. In the present process, it can produce a sheet with a size corresponding to two insoles or more. In particular, the length of the mould cavity according to the present invention may be from about 5 to about 115 cm, preferably from about 15 to about 36 cm, more preferably from about 18 to about 34 cm, most preferably from about 20 to about 33 cm; the width of the mould cavity may be from about 5 to about 115 cm, preferably from about 11 to about 29 cm, more preferably from about 14 to about 26 cm, most preferably from about 16 to about 25 cm.

In the process of the present invention, the raw materials for forming the PU foam are maintained at a temperature from about 20 to about 48° C. prior to pouring into the mould.

In step (1) of the process according to the present invention, the temperature of the mould is set to from about 25 to about 60° C.

In step (1) of the process according to the present invention, the reacting time may be from about 2 to about 30 minutes, preferably from about 3 to about 10 minutes, more preferably from about 4 to about 8 minutes, and most preferably from about 4 to about 6 minutes. During the reaction, the materials are subjected to foaming and ageing.

In step (2) of the process according to the present invention, after demoulding, the PU sheet is allowed to stand at room temperature or a temperature from about 30 to about 50° C. for about 6 to about 24 hours, then split into two halves in the horizontal direction. The thickness of the two halves may be same or different, preferably be same.

In the step (3) of the process according to the present invention, the fabric is attached onto the surface having open pores of the material obtained in step (2), in which an adhesive or a TPU (thermoplastic PU) hot melt film may be used. When using the TPU hot-melt film, the TPU hot-melt film is firstly pasted onto the fabric, and then the fabric is attached to the surf open pores of the PU sheet. During the hot pressing, the TPU hot-melt film melts and bonds the fabric and the PU sheet together.

In step (3) of the process according to the present invention, the temperature of the hot pressing is from about 120 to about 180° C. and the hot pressing time is from about 1 to about 2.5 minutes.

After the attachment of the fabric, the resultant material is cut into the desired size, in order to obtain the finished insole.

The PU foam used in the present invention is prepared by reacting a polyol component with a polyisocyanate component in the presence of a chain extender, a catalyst, a blowing agent and optional other additives.

The raw materials for forming the PU foam include A and B components, wherein:

Component A comprises at least one polyol, a blowing agent and optional other additives;

Component B comprises at least one polyisocyanate.

In the present invention, the NCO index of the raw materials is from about 98 to about 125, more preferably from about 102 to about 118, most preferably from about 105 to about 115.

The polyol used in the present invention may be any polyol suitable for preparing PU foams, such as polyether polyols or polyester polyols. However, it has been found that when using the following polyols in combination with the inventive process, the obtained insole has good mechanical properties, including a good hardness, tensile strength, tear strength, vertical resilience and compression resistance:

(1) Polyol A: a propylene oxide and/or ethylene oxide-terminated polyol having a functionality of from about 2 to about 8 and a hydroxyl value of from about 14 to about 150 mg KOH/g. Polyol A has an ethylene oxide content of not more than 40% by weight. Polyol A can be obtained by polymerizing propylene oxide and/or ethylene oxide using a polyhydric alcohol such as glycerol, trimethylol propane or pentaerythritol as the starting agent; and (2) Polyol B: styrene and acrylonitrile grafted polyether polyol having a functionality of about 3, a solid content of no more than 45%, and a hydroxyl value of from about 20 to about 40 mg KOH/g.

The polyisocyanates used in the present invention may be any polyisocyanate suitable for preparing the PU foams. However, it has been found that when using a polyisocyanates prepolymer obtained by reacting diphenylmethane-4, 4'-diisocyanate (MDI), diphenylmethane-2,4'-diisocyanate and/or a carbodiimide-modified diphenylmethane diisocyanate with a polyol in combination with the inventive process, the obtained insole has good mechanical properties including a good hardness, tensile strength, tear strength, vertical resilience and compression resistance. The NCO content of the prepolymer is from about 16 to about 33.5% by weight, based on the total weight of the prepolymer. Here, the polyol may be a polyol descril for Polyol A.

The blowing agents used in the present invention may be a chemical blowing agent such as water and/or formic acid. The present invention may also use a physical blowing agent. The physical blowing agent may be selected from, for example, propane, n-butane, isobutane, cyclobutane, n-pentane, isopentane, cyclopentane, cyclohexane, dimethyl ether, methyl ethyl ether, methyl butyl ether, methyl formate, acetone and fluorinated paraffins which are degradable in the troposphere and thus do not destroy the ozone layer such as trifluoromethane, difluoromethane, 1,1,1,3,3-pentafluorobutane, 1,1,1,3,3-pentafluoropropane, 1,1,1,2-tetrafluoroethane, difluoroethane and heptafluoropropane. The blowing agent is usually used in an amount of from about 0.1 to about 15% by weight, preferably from about 0.1 to about 10% by weight, particularly preferably from about 0.1 to about 5% by weight, based on the total weight of the reaction mass.

Component A of the present invention may also includes optional additional additives, such as a cell opener, a chain extender and/or a crosslinking agent, a foam stabilizer, a catalyst, an antibacterial agent and the like.

The cell opener is generally a surfactant comprising a hydrophobic moiety and a hydrophilic moiety. The cell opener could reduce the surface tension of the foam and promote the breakage of the foam. The cell opener commonly used may be liquid paraffin, polybutadiene, methylpolysiloxane, and polyether polyol. The preferred polyether polyol may be a propylene oxide and/or ethylene oxide-terminated polyol having a functionality of from about 2 to about 4, an ethylene oxide content of more than 30% by weight and a hydroxyl value of from about 20 to about 70 mg KOH/g.

As chain extenders and/or crosslinking agents, it is possible to use bifunctional or trifunctional amines and alcohols, in particular diols, triols or both. Bifunctional compounds of this type are referred to as chain extenders and trifunctional or higher-functional compounds are referred to as crosslinking agents. As examples, it may be mentioned ethylene glycol, 1,2-propanediol, 1,3-propanediol, 1,2-pentanediol, 1,3-pentanediol, 1,10-decanediol, 1,2-dihydroxycyclohexane, 1,3-dihydroxycyclohexane, 1,4-dihydroxycyclohexane, diethylene glycol and triethylene glycol, dipropylene glycol and tripropylene glycol, 1,4-butanediol, 1,6-hexanediol and bis(2-hydroxyethyl) hydroquinone; triols such as 1,2,4-trihydroxycyclohexane, 1,3,5-trihydroxycyclohexane, glycerol and trimethylolpropane.

Foam stabilizers are materials which promote formation of a regular cell structure during foaming. Examples are: silicon-comprising foam stabilizers such as siloxane-alkylene oxide copolymers and other organopolysiloxanes. Also may be used are alkoxylation products of fatty alcohols, oxo alcohols, fatty amines, alkylphenols, dialkylphenols, alkylcresoles, alkylresorcinol, naphthol, alkylnaphthol, naphthylamine, aniline, alkylaniline, toluidine, bisphenol A, alkylated bisphenol A, polyvinyl alcohol and also alkoxylation products of condensation prod maldehyde and alkylphenols, formaldehyde and dialkylphenols, formaldehyde and les, formaldehyde and alkylresorcinol, formaldehyde and aniline, formaldehyde and toluidine, formaldehyde and naphthol, formaldehyde and alkylnaphthol and also formaldehyde and bisphenol A or mixtures of two or more of these foam stabilizers. The foam stabilizer is preferably used in an amount of from about 0.5 to about 4.0% by weight, particularly preferably from about 1.0 to about 3.0% by weight, based on the total weight of the reaction mass.

As the catalysts, it is possible to use all of the compounds capable to promote the reaction between an isocyanate and water and/or the reaction between an isocyanate and a polyol. These catalysts are known and described by way of example in "Kunststoffhandbuch, Volume 7, Polyurethane", Carl Hanser Verlag, 3rd edition 1993, chapter 3.4.1. These include amine-based catalysts and catalysts based on organometallic compounds, preferably tertiary amine catalysts. The catalyst used may be, for example, bis (2-dimethylaminoethyl) ether, N,N,N,N,N-pentamethyldiethylenetriamine, N,N,N-triethylaminoethoxy ethanol, dimethylcyclohexylamine, dimethylbenzylamine, triethylamine, triethylenediamine, pentamethyldipropylenetriamine, dimethylethanolamine, N-methylimidazole, N-ethyl imidazole, tetramethylhexamethylenediamine, tris (dimethylaminopropyl) hexahydrotriazine, dimethylaminopropylamine, N-ethylmorpholine, diazabicycloundecene or diazabicyclononene. The catalyst is used preferably in an amount of from about 0.1 to about 10.0% by weight, preferably from about 0.5 to about 5.0% by weight, more preferably from about 1.0 to about 3.0% by weight, based on the total weight of the reaction mass.

The antibacterial agents can be those commonly known to the person skilled in the art for use the insole, such as Zinc Omadine 48% FPS Ind commercially available from Arch Chemical (China) Co., Ltd.

In the process according to the present invention, the polyol may be premixed with a blowing agent and the optional other additives such as a cell opener, a chain extender, a catalyst and the like to obtain a premixed Component A; and then the Component B is added to one hopper of a low-pressure pouring machine, and the premixed Component A is added to the other hopper of the low-pressure pouring machine, respectively; and then the Component B and the premixed Component A are poured into the mould through the stirring head of the low-pressure pouring machine; the mould is closed, then reaction occurs.

In particular, the process for producing the PU foam insole of the present invention comprises the following steps of:

i) premixing the polyol component with a blowing agent and the optional other additives, such as a cell opener, a chain extender and a catalyst to obtain a premixed polyol composition;

ii) pouring the premixed polyol composition and the isocyanate component into a mould by means of a pouring machine; reacting to obtain a PU sheet;

iii) after allowing the PU sheet to stand under room temperature for about 6 to hours, splitting the PU sheet into two halves in the horizontal direction to obtain two PU insole material, wherein each piece has two surfaces, with one surface having open pores, and the other surface having a skin;

iv) attaching a piece of fabric onto the surface having open pores of the material obtained in step iv); and v) hot pressing the sheet obtained in step v) and then cutting into the insole having the desired size.

In the process, the pouring machine may be a low-pressure pouring machine. The premixed polyol composition obtained in step i) is fed into one hopper of the low-pressure pouring machine, and the isocyanate component is fed into the other hopper of the low-pressure pouring machine, respectively. Then the premixed polyol composition and the isocyanate component are passed through the stirring head of the low-pressure pouring machine and mixed therein, then pouring into the mould.

The present invention also provides a formulation design that is compatible with the inventive process. By combining the selection of the polyether polyol and the prepolymer of diphenylmethane diisocyanate and the use of the corresponding additives with the inventive process, the resulted casting moulded breathable insole possesses high physical properties, good resilience, smooth skin, good air-permeability and sweat absorption, good cushioning effect and light weight; moreover, the utilization ratio of materials is high.

The typical physical properties of the insole obtained by the present invention are as follows:

TABLE 1

| Items | Performances | Testing Standards |
|---|---|---|
| Density | 145-155 kg/m$^3$ | DIN 53420 (=ISO 845) |
| Hardness | 25-35 Asker C | ASTM D2240 |
| Tensile strength | >=5.5 kg/cm$^2$ | ASTM D412 |
| Tear strength | >=2.1 N/mm | DIN ISO 34-1 (method B) |
| Vertical resilience | >=38% | DIN 53512 |
| Compression resistance | <=15% | ASTM D395: 2003 |

DESCRIPTION OF FIGURES

FIG. 1 is a schematic drawing showing a part of the process of the present invention.

The invention is further illustrated by the following examples.

Examples

The raw materials used in the examples are as follows:

Polyol-A: a polyether polyol having a relative molecular weight of 6000, a functionality of 3 and a hydroxyl value of about 28 mg KOH/g, commercially available under TEP-3600 from Sinopec Tianjin Petrochemical Company;

Polyol-B: styrene and acrylonitrile grafted polyether polyol having a solid content of about 30%, a hydroxyl value of about 25 mg KOH/g, commercially available under TPOP36/28 from Sinopec Tianjin Petrochemical Company;

Polyol-C: a polyether polyol having a relative molecular weight of 3500, a functionality of 3 and a hydroxyl value of about 42 mg KOH/g, commercially available under Lupranol 2048 from BASF Company; this polyol is EO content rich and act as a cell opener.

Ethylene glycol (EG): chain extender;
1,4-Butanediol (1,4-BDO): chain extender;
Distilled water (H$_2$O): foaming agent;
Catalyst A: aminic gel type catalyst; commercially available under Dabco EG from Air Product;
Catalyst B: aminic gel type catalyst, triethanolamine;
Catalyst C: aminic foaming catalyst; commercially available under A1 from Air Product;
Foam Stabilizer: DC 2585, available from Air Products;
Isocyanate prepolymer components:
Prepolymer 1: NCO %=20%, obtained by the reaction of diphenylmethane-4,4'-diisocyanate and carbodiimide-modified diphenylmethane diisocyanate with a polyether polyol, wherein the polyether polyol has 13% by weight of EO (terminated), a number average molecular weight of about 4800 and a functionality of 3; Elastopan CS9500C-B, available from BASF Polyurethanes (China) Co., Ltd.

Prepolymer 2: NCO %=24%, obtained from the reaction of diphenylmethane-2,4'-diisocyanate (2,4'-MDI), diphenylmethane-4,4'-diisocyanate (4,4'-MDI), carbodiimide-modified diphenylmethane diisocyanate (LUPRANATE MM103C) and polymeric MDI (LUPRANATE M20S) with a polyether polyol, wherein the polyether polyol has 13% by weight of EO (capped), a number average molecular weight of about 4800 and a functionality of 3; the basic recipes for preparing Prepolymer 2 is: 4,4MDI 30%+2,4MDI 5%+LUPRANATE MM103C 38.5%+LUPRANATE M20S 5%+Polyol 21.5% react at 75° C. for 1.5 hours.

According to the following Table 2, the polyol component was premixed with additives such as a chain extender, a catalyst, a foaming agent and the like to obtain a premixed polyol composition. The premixed polyol composition was fed into one hopper of a low-pressure pouring machine (N-series 2-component pouring machine, from Taiwan Green Industry Co., Ltd.) and the isocyanate prepolymer component was fed into the other hoppers of the low-pressure pouring machine, and preheated to 40° C., respectively; and the two components we through the stirring head of the low-pressure pouring machine into a mould preheated Then the mould was closed, and the raw materials were allowed to foam and age for 6 minutes. Subsequently, the mould was opened and the PU sheet was removed. Before the next process step, the PU sheet was allowed to stand under room temperature for 24 hours.

The size of the mould used in Comparative Example 1 was an insole mould (i.e., its shape and size exactly correspond to those of one insole), and a piece of fabric was placed in the upper half mould. The size of the mould cavity used in Comparative Example 2 was 35 cm*25 cm*10 cm, and the size of the mould cavity used in Example 1 was 35 cm*25*1.5 cm.

For Comparative Example 1, after the formed insole was removed from the mould, the flash was removed to obtain the finished insole. For Comparative Example 2, after removing the PU foam from the mould, the upper and lower skin layers were removed, and cut into an insole material having a thickness of 0.7 cm, and then a piece of fabric was bonded onto each of the upper and lower surfaces of the insole material respectively with an adhesive (7710 water-based glue, commercially available from Dongguan Glober Glue Corporation Limited), hot pressed in a hot pressing machine (commercially available from Dongguan Chenghao Machinery co., Ltd.) under 170° C. for 2 minutes, then the flash was removed to obtain the finished insole. For Example 1, after the PU foam was removed from the mould, it was split into two halves along the horizontal plane, and a piece of fabric was bonded onto the surface having open pores with an adhesive (7710 water-based glue, commercially available from Dongguan Glober Glue Corporation Limited), and then hot pressed in a hot pressing machine (commercially available from Dongguan Chenghao Machinery co., Ltd.) under 170° C. for 2 minutes, subsequently the flash was removed to obtain the finished insole.

Example 1 is based on the inventive process, whereas Comparative Example 1 is based on the in-mould casting insole production process from the prior art, and Comparative Example 2 is based on the foamed breathable insole production process from the prior art. Table 2 below shows the composition and weight percentages of the raw materials used.

TABLE 2

| Polyol component | Comparative Example 1 | Comparative Example 2 | Example 1 | Example 2 |
|---|---|---|---|---|
| Polyol A | 75.78 | 70.58 | 74.98 | 68.98 |
| Polyol B | 20 | 20 | 20 | 20 |
| Polyol C | | | | 6 |
| EG | 0.5 | 5 | 0.5 | 0.5 |
| 1,4-BDO | 0.5 | 0.5 | 0.5 | 0.5 |
| Catalyst A | 1 | 1 | 1 | 1 |
| Catalyst B | 1 | 1 | 1 | 1 |
| Catalyst C | 0.12 | 0.12 | 0.12 | 0.12 |
| DC 2585 | 0.2 | 0.2 | 0.2 | 0.2 |
| Distilled water($H_2O$) | 0.9 | 1.6 | 1.7 | 1.7 |
| Isocyanate prepolymer component | | Weight parts | | |
| Prepolymer 1 | 100 | | | |
| Prepolymer 2 | | 100 | 100 | 100 |
| NCO value | 20% | 24% | 24% | 24 |
| NCO index | 105 | 112 | 112 | 112 |

Table 3 below shows the basic physical properties of the foamed insole materials. The appearance is visually evaluated, wherein "good" indicates that the surface is smooth, and "bad" indicates that the surface is not smooth. The air permeability is evaluated by a panel and given a rating from 1 to 3, wherein 1 indicates that the air permeability is poor, that is, when blowing air through the insole material, the air cannot pass through the material at all; and 3 indicates that the air permeability is excellent, that is, when blowing air through the insole material, the air can pass through the material unimpededly.

TABLE 3

| | Comparative Example 1 (in-mould casting insole) | Comparative Example 2 (foamed breathable insole) | Example 1 (according to the present invention) | Example 2 (according to the present invention) | Test Standard |
|---|---|---|---|---|---|
| Density, g/cm³ | 0.320 | 0.130 | 0.152 | 0.150 | DIN EN ISO 845 |
| Hardness, Asker C | 29 ± 1 | 26 ± 1 | 27 ± 1 | 26 ± 1 | ASTM D2240 |
| Tensile strength, kg/cm² | 6.2 | 5.7 | 5.6 | 5.8 | DIN 53504 |
| Tear strength, kg/cm | 2.6 | 2.4 | 2.3 | 2.4 | DIN ISO 34-1 (method B) |
| Compression strength, % | 10 | 14 | 14 | 13 | ASTM D395 |

TABLE 3-continued

| | Comparative Example 1 (in-mould casting insole) | Comparative Example 2 (foamed breathable insole) | Example 1 (according to the present invention) | Example 2 (according to the present invention) | Test Standard |
|---|---|---|---|---|---|
| Vertical resilience, % | 39 ± 1 | 26 ± 1 | 39 ± 1 | 39 ± 1 | ASTM D2632 |
| Air permeablity | 1 | 3 | 2 | 3 | |
| Appearance | Good | Bad | Good | Good | |

It can be seen that the skin of the insole prepared by the process of the present invention is smooth, at the same time, the insole has good air permeability, a low density and a good resilience. Moreover, the utilization ratio of materials has been improved over the breathable foam production process, which could amount to 85% or above.

The invention claimed is:

1. A process for producing a polyurethane (PU) foam insole, comprising the following steps of:
   (1) pouring the raw materials used to form a PU foam into a mould, reacting to obtain a PU sheet, wherein the height of the mould cavity is from about 1.0 to about 1.6 times of the total thickness of two finished insoles;
   (2) splitting the PU sheet into two halves in the horizontal direction to obtain two pieces of PU insole material, wherein one surface of the material has open pores, and the other surface of the material has a skin; and
   (3) attaching a piece of fabric onto the surface having open pores of the material obtained in step (2).

2. The process according to claim 1, wherein the height of the mould cavity is from about 0.2 to 8.0 cm.

3. The process according to claim 1, wherein the shape of the mould cavity is a cube or a rectangle, or the profile of the mould cavity corresponds to the profile or the enlarged profile of the insole.

4. The process according to claim 1, wherein the length of the mould cavity is from about 5 to about 115 cm.

5. The process according to claim 1, wherein the raw materials for forming the PU foam are maintained at a temperature of 20-48° C. prior to pouring into the mould.

6. The process according to claim 1, wherein in step (1), the temperature of the mould is set to 25-60° C.

7. The process according to claim 1, wherein in step (1), the reacting time is from about 2 to about 30 minutes.

8. The process according to claim 1, wherein in step (2), after demoulding, the PU sheet is allowed to stand under room temperature or a temperature from about 30 to about 50° C. for about 6 to about 24 hours, then split into two halves.

9. The process according to claim 1, wherein the raw materials for forming the PU foam include A and B components, wherein Component A comprises at least one polyol and a blowing agent and optional other additives; and Component B comprises at least one polyisocyanate.

10. The process according to claim 9, wherein the NCO index of the raw materials is from about 98 to about 125.

11. The process according to claim 9, wherein the polyol comprises
   (1) Polyol A: a propylene oxide and/or ethylene oxide-terminated polyol having a functionality of from about 2 to about 8, an ethylene oxide content of not more than 40% by weight and a hydroxyl value of from about 14 to about 150 mg KOH/g; and
   (2) Polyol B: a styrene and acrylonitrile grafted polyether polyol having a functionality of about 3, a solid content of no more than 45%, and a hydroxyl value of from about 20 to about 40 mg KOH/g.

12. The process according to claim 9, wherein the polyisocyanates is a prepolymer obtained by reacting diphenylmethane-4,4'-diisocyanate (MDI), diphenylmethane-2,4'-diisocyanate and/or a carbodiimide-modified diphenylmethane diisocyanate with a polyol, wherein the NCO content of the prepolymer is from about 16 to about 33.5% by weight, based on the total weight of the prepolymer.

13. The process according to claim 9, wherein the optional other additives comprise Polyol C as a cell opener: a propylene oxide and/or ethylene oxide-terminated polyol having a functionality of from about 2 to about 4, an ethylene oxide content of more than 30% by weight and a hydroxyl value of from about 20 to about 70 mg KOH/g.

14. A process for producing a polyurethane (PU) foam insole, comprising the following steps of:
   i) premixing a polyol component with a chain extender, a catalyst, a blowing agent and other additives to obtain a premixed polyol composition;
   ii) pouring the premixed polyol composition and the isocyanate component into a mould by means of a pouring machine; reacting to obtain PU sheet;
   iii) after allowing the PU sheet to stand under room temperature for about 6 to about 24 hours, splitting the PU sheet into two halves in the horizontal direction to obtain two pieces of PU insole material, wherein each piece has two surfaces, with one surface having open pores, and the other surface having a skin;
   iv) attaching a piece of fabric onto the surface of the material obtained in step iii) having open pores; and
   v) hot pressing the sheet obtained in step iv) and then cutting into the insole having the desired size.

15. The process according to claim 1, wherein the height of the mould cavity is from about 1.1 to about 1.2 times of the total thickness of two finished insoles.

16. The process according to claim 1, wherein the height of the mould cavity is from about 0.3 to about 2.0 cm.

17. The process according to claim 1, wherein the length of the mould cavity is from about 16 to about 25 cm.

18. The process according to claim 1, wherein in step (1), the reacting time is from about 4 to about 6 minutes.

19. The process according to claim 9, wherein the NCO index of the raw materials is from about 105 to about 115.

* * * * *